April 7, 1964　　C. M. BLYTHE ETAL　　3,127,746
PNEUMATIC CAPACITOR

Filed July 7, 1961　　　　　　　　　　　　2 Sheets-Sheet 1

INVENTORS
CLARENCE M. BLYTHE
GERALD T. HAMMOND
BY Thomas L. Ross
Albert N. Scribner
ATTORNEYS

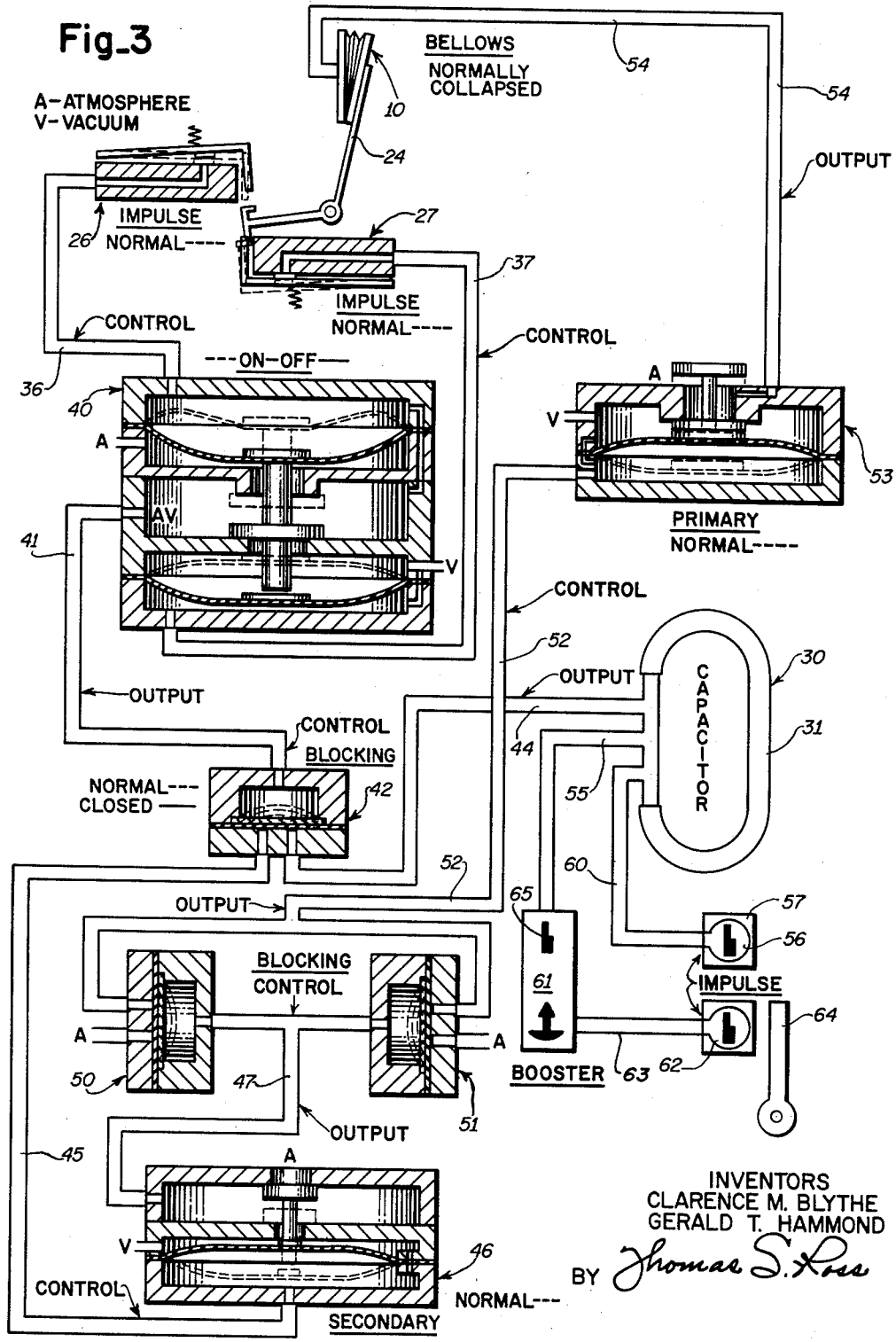

United States Patent Office 3,127,746
Patented Apr. 7, 1964

3,127,746
PNEUMATIC CAPACITOR
Clarence M. Blythe and Gerald T. Hammond, Hendersonville, N.C., assignors to Royal McBee Corporation, Port Chester, N.Y., a corporation of New York
Filed July 7, 1961, Ser. No. 122,477
9 Claims. (Cl. 60—60)

This invention relates to a pneumatic valving means which is capable of automatically initiating a succession of self-controlling pressure impulses, and more particularly relates to a pneumatic capacitor and related circuit means for automatically initiating a predetermined number of successive pressure impulses so that a predetermined number of cyclic operations of an associated actuating means may be effected.

There are many instances where it is desirable to have an actuator or control valve repeatedly operated a predetermined number of times. For example, in those data processing systems which are automatically operated and an electric typewriter is utilized to control the operation of a record tape punch unit, it may be desirable to have the tape feed mechanism advance the record tape through several incremental non-punching steps during a carriage return operation of the typewriter. This type of repeat actuation for the tape feed mechanism of the punch unit is sometimes provided so that when the perforated record is being subsequently read and a call is made for a carriage return operation, the typewriter carriage will have time to complete its return movement during the time that the immediately following unpunched length of the tape is passing over the reading head and before the next set of perforated code holes is read. In this way there will be no typing operations attempted during the carriage return motion. In the instant arrangement pneumatic means are provided for automatically repeatedly actuating the tape feed mechanism of the record punch unit during a carriage return operation, this pneumatic means including a pneumatic storage tank having predetermined storage volume so that a predetermined amount of air as determined by said volume is available for initiating a predetermined number of control impulses for said tape feed mechanism.

One object of the invention is to provide a novel pneumatic capacitor or storage tank having a predetermined air capacity which is used to determine the number of pneumatic impulses which are successively applied to an associated pneumatic control valve means.

Another object of the invention is to provide a novel pneumatic storage and control means for initiating predetermined numbers of pneumatic pressure impulses.

Another object of the invention is to provide a novel pneumatic control circuit for automatically initiating a predetermined succession of control pressure impulses for repeatedly operating an associated actuating linkage.

A further object of the invention is to provide a novel pneumatic control system wherein a pneumatic actuator may be automatically repeatedly triggered by means of a predetermined number of pneumatic pressure impulses emanating from a pneumatic storage tank having a predetermined amount of available air capacity, the pneumatic actuator having a feed back control for controlling the transfer of control impulses from said storage tank.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is an active side elevational view illustrating an exemplary pneumatic actuating linkage that is adapted to incrementally feed a perforated record through a record punch unit or the like.

FIGURE 3 is a circuit diagram illustrating an exemplary pneumatic control circuit for an actuating linkage.

Figure 1:
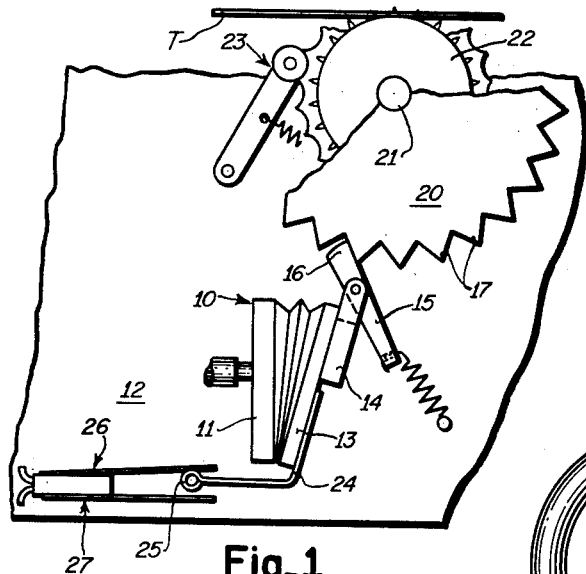

Referring to FIGURE 1 there is shown a conventional type actuator valve or bellows assembly 10 having a fixed wall 11 that is secured by any suitable means to the machine frame 12 and a movable wall 13 to which is secured an extension arm 14. Pivotally mounted on the arm 14 is a spring biased ratchet pawl 15 having formed at one end thereof a tooth 16 which is adapted to co-operate in the usual manner with the teeth 17 of a ratchet wheel 20. Wheel 20 is secured to a shaft 21 that mounts and drives a record feed sprocket drum 22. A yieldable detent unit 23 is provided to maintain the drum 22 and the record tape T in predetermined successive indexed positions. As will be apparent the record feed sprocket drum 22 will be incrementally rotatably advanced in response to the successive operation of the actuating bellows assembly 10. A control finger 24 is fastened to the movable wall 13 of the bellows assembly and has a free end 25 which is adapted to alternately operate two feed-back impulse valves 26 and 27 when the bellows assembly is respectively in its expanded condition as shown in FIGURE 1 and in its normal collapsed condition. The construction and operation of the bellows assembly 10, the impulse valves 26 and 27 and the various other types of pneumatic valves used in the circuit diagram of FIGURE 3 are well known and most are described in U.S. Patent 2,894,614; if more details are desired in connection therewith reference may be made to said patent.

Figure 2:
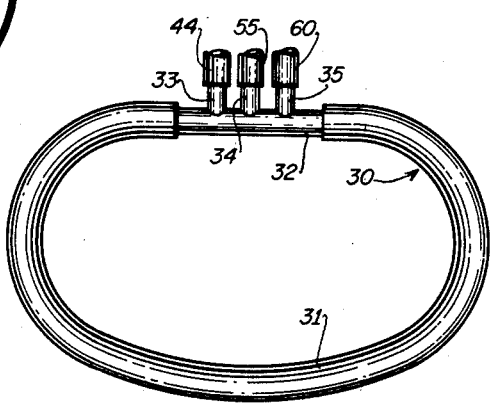
FIGURE 2 is a plan view showing an exemplary pneumatic capacitor.

Referring to FIGURE 2 there is shown an exemplary pneumatic capacitor 30 which in this case comprises a looped piece of tubing 31 that is pneumatically connected to either end of the tubular element 32 which has a plurality of outlet nipples such as 33, 34 and 35 formed along the length thereof and to which external control tubing lines 43, 55 and 60 are respectively pneumatically connected as will be further explained below. The capacitor 30 defines a closed storage tank having a predetermined storage volume which may be adjusted by appropriately varying the effective length of the tubing 31.

Referring to FIGURE 3 there is shown a pneumatic circuit which is adapted to control the automatic repeat operations of the bellows assembly 10. The feed back impulse valves 26 and 27 are respectively pneumatically connected to the control lines 36 and 37 of the on-off valve 40 whose output line 41 in turn is connected to the control line of the blocking valve 42. The blocking valve 42 is operatively disposed in an output line 44 that interconnects a pneumatic capacitor 30 with a control line 45 for a secondary valve 46. The output line 47 of valve 46 is connected to the control lines of parallel blocking valves 50 and 51. The flow lines of blocking valves 50 and 51 are connected to a common control line 52 for a primary valve 53. The output line 54 of valve 53 is pneumatically connected to the bellows control line so as to be capable of operating said bellows assembly 10. The pneumatic capacitor 30 is pneumatically connected by a control line 60 to an impulse valve 56 that is manually operable from the control panel 57 of the apparatus and is also connected by a control line 55 to a booster valve 61 that is controlled by the operation of an impulse valve 62 through line 63. The impulse valve 62 is, in this application, adapted to be operated by the power operated carriage return linkage 64 of the electric typewriter. The booster valve assembly 61 may be similar to that shown and described in FIGURE 1 of U.S. Patent 2,932,375 and wherein only a single output line 60 is provided for the impulse valve 65 of the assembly. It will be understood that a suitable sub-atmospheric pressure source is provided for and connected to the instant pneumatic circuitry in a manner that is well understood in the art.

In the normal condition of the parts bellows 10 is collapsed and, through finger 24, maintains impulse valve 27 open (dotted line) thus connecting on-off valve 40 to atmosphere by way of control line 37. This keeps the on-off valve in its "on" or normal (dotted) condition whereby its output line 41 is connected to vacuum. Blocking valve 42 is accordingly connected to vacuum by its control line 41 and is held open, thus connecting capacitor 30 to secondary valve 46 by way of output and control lines 44 and 45. With valve 46 in its normal condition (dotted line) control line 45 is connected to vacuum via the bleed channel in the valve and accordingly capacitor is evacuated. Under these conditions the output line 47 of valve 46 is connected to atmosphere and as this line is connected to the control lines of parallel blocking valves 50 and 51, these valves are held closed (solid line). This results in a subatmospheric pressure in control line 52 leading to primary valve 53 by way of the bleed channel in the valve maintaining this valve in the dotted line position whereby its output line 54 is connected to vacuum thus retaining bellows 10 in its normal collapsed condition.

With the circuit in this normal condition, when either of the impulse valves 56 or 62 is momentarily operated, capacitor 30 will be filled with air and the resultant atmospheric pressure produces a signal impulse through lines 44 and 45 to secondary valve 46 causing this valve to shift to its full line position thereby connecting its output line 47 to vacuum. This results in operation of blocking valves 50 and 51 to the dotted line position thereby connecting line 52 to atmosphere causing primary valve 53 to shift to the full line position whereby its output line 54 is connected to atmosphere. This results in expansion of bellows 10 and clockwise movement of finger 24 to open impulse valve 26 to atmosphere and permit closure of impulse valve 27. When bellows 10 is so expanded pawl 15 (FIGURE 1) is operatively positioned behind the next tooth of ratchet wheel 20 preparatory for a subsequent driving movement.

When impulse valve 26 is so opened, control line 36 is connected to atmosphere causing on-off valve 40 to shift to its full line position wherein its output line 41 is connected to atmosphere as is blocking valve 42 which accordingly shifts to its full line or closed position thus mutually isolating secondary valve 46 and capacitor 30. This prevents all of the air in the capacitor from being drawn through the conventional bleed passage of the secondary valve during the first operation of the bellows 10. The quantity of air initially held by capacitor 30 is greater than that required to initiate the first signal impulse in control line 45 to reverse secondary valve to its full line position.

When blocking valves 42 close as noted, control line 45 is closed to atmospheric pressure and accordingly the vacuum resulting in secondary valve 46 via the bleed passage causes it to shift to its dotted line position wherein its output line 47 is again connected to atmosphere thus to close blocking valves 50 and 51 (full line position). As control line 52 is now cut off from atmosphere, primary valve 53 returns to its dotted line position to reconnect its output line 54 to vacuum thus causing bellows 10 to collapse. When the bellows is thus collapsed to its normal condition ratchet wheel 20 will be advanced one step by the movement of pawl 15, and the finger 24, in moving back to its normal position, will permit the closure of impulse valve 26 and will again open impulse valve 27.

Valve 27 so opened will thus again shift on-off valve 40 to its "on" condition (dotted line) whereby blocking valve 42 is reopened and capacitor 30 is again pneumatically connected to the secondary valve control line 45 and another circuit operation similar to that described above will operate bellows assembly 10. This alternate and automatic opening and closing of the impulse valves 26 and 27 will correspondingly operate blocking valve 42 so as to pneumatically connect and mutually isolate the capacitor 30 and the control valve 46. As the valve 46 is thus repeatedly operated by successive pressure impulses from the capacitor 30 the amount of available air in the capacitor which can cause the operation of valve 46 will gradually decrease until finally the stored reservoir of available air is exhausted and the valve 46 will not operate when the blocking valve 42 is opened. For one filling of a given sized capacitor 30 there will be a predetermined number of control pressure impulses available for cyclically operating the valve 46 and hence the bellows assembly 10 will be automatically and repeatedly operated a corresponding number of times once the succession of control pulses has been initiated by operation of either of the impulse valves 56 and 62.

When the above described circuitry is applied to a data processing system as above described and a carriage return operation of an electric typewriter is initiated, a carriage return code is punched in the tape in the usual manner in response to the movement of linkage 64 and this movement of linkage 64 will also cause the capacitor 30 to be filled with air so that the tape feed mechanism of the record punch unit, as shown in FIGURE 1, will incrementally index the record tape through a predetermined number of feed steps during the ensuing carriage return operation. In this way there will be no holes punched in the next predetermined short length of record tape thus insuring that during a subsequent reading of this portion of the tape no typing operations will be initiated until after completion of any carriage return movement called for.

As will be apparent the instant type of pneumatic capacitor and related circuit may be used in various environments where predetermined number of automatically repeated signal impulses are desired. After prolonged tests the instant arrangement has been found to have an exceptionally long life of accurate and reliable performance and requires little if any maintenance or adjustment.

While there is in this application specifically described one form which the invention may assume in practice, it will be understood that this form of the same is shown for purposes of illustration only and that the invention may be modified and embodied in various other forms without departing from its spirit or the scope of the appended claims.

The invention claimed is:
1. In a pneumatic circuit including a motor for an actuating linkage in combination,
   a pneumatically operated valve having a control line through which signal impulses may be passed to control operation of said valve between two operative positions,
   a normally evacuated pneumatic capacitor having a predetermined storage volume for air at atmospheric pressure and connectable to said control line,
   means including a valve element connected to said capacitor and to atmosphere and effective upon opening operation of said valve element to fill said capacitor with air at atmospheric pressure,
   and valve means connected in said control line and operable between open and closed positions to connect said capacitor to said control line when open thus to intermittently permit air to flow through said control line from said capacitor to said first valve to effect operation of said first valve between its two said positions a given number of times as determined by the storage volume of said capacitor.

2. In a pneumatic circuit including a motor for an actuating linkage in combination,
   a pneumatically operated valve having a control line through which signal impulses may be passed to control operation of said valve between two operative positions,
   a normally evacuated pneumatic capacitor having a predetermined storage volume for air at atmospheric pressure and connectable to said control line, means including a valve element connected to said capacitor and to atmosphere and effective upon opening operation of said valve element to fill said capacitor with air at atmospheric pressure, valve means connected in said control line and operable between open and closed positions to connect said capacitor to said control line when open thus intermitently to permit air to flow through said control line from said capacitor to said first valve to effect operation of said first valve between its two said positions a given number of times as determined by the storage volume of said capacitor, and means connected to said valve means and actuated upon operation of said first valve from one to the other of its positions to effect operation of said valve means to closed position to block said control line.

3. In a pneumatic circuit for a motor in combination, an actuating linkage, a pneumatically operated valve having a control line through which signal impulses may be passed to control operation of said valve between two operative positions, a normally evacuated pneumatic capacitor having a predetermined storage volume for air at atmospheric pressure and connectable to said control line, means including a valve element connected to said capacitor and to atmosphere and effective upon opening operation of said valve element to fill said capacitor with air at atmospheric pressure, valve means connected in said control line and operable between open and closed positions to connect said capacitor to said control line when open thus intermittently to permit air to flow through said control line from said capacitor to said first valve to effect operation of said first valve between its two said positions a given number of times as determined by the storage volume of said capacitor, and means connected to said valve means and actuated upon operation of said first valve from one to the other of its positions to effect operation of said valve means to closed position to block said control line, said last mentioned means including a valve openable to atmosphere and adapted to be operated by said linkage.

4. In a pneumatic circuit for a motor in combination, an actuating linkage, a pneumatically operated valve having a control line through which signal impulses may be passed to control operation of said valve between two operative positions, a normally evacuated pneumatic capacitor having a predetermined storage volume for air at atmospheric pressure and connectable to said control line, means including a valve element connected to said capacitor and to atmosphere and effective upon opening operation of said valve element to fill said capacitor with air at atmospheric pressure, valve means connected in said control line and operable between open and closed positions to connect said capacitor to said control line when open thus intermittently to permit air to flow through said control line from said capacitor to said first valve to effect operation of said first valve between its two said positions a given number of times as determined by the storage volume of said capacitor, and pneumatic means connected to said first valve and operable upon operation of said first valve to one of its positions to effect actuating operation of said linkage.

5. Apparatus in accordance with claim 4 wherein said pneumatic means includes a bellows, and means operated by said bellows to effect operation of said valve means between its open and closed positions.

6. Pneumatic apparatus for cyclically operating a tape feeding mechanism comprising, in combination, a bellows operable between expanded and collapsed positions, means actuated by said bellows upon operation thereof, a first valve pneumatically connected to said bellows and connectable to vacuum and atmosphere for operating said bellows between its said positions, pneumatic means connected to said first valve and operable to effect actuation of said valve to connect it to atmosphere whereby said bellows is connected to atmosphere to cause expansion thereof, a normally evacuated capacitor having a predetermined storage volume for air at atmospheric pressure, means operable to fill said capacitor with air at atmospheric pressure, an output line connected to said capacitor, a control line connected to said pneumatic means, and a second valve connected to said lines and operable between open and closed positions to interconnect said lines or block them thereby to connect said capacitor to said pneumatic means or isolate it therefrom whereby said pneumatic means is operated when said lines are interconnected and said capacitor is charged with air.

7. Apparatus in accordance with claim 6 including means operated by said bellows upon expansion thereof to actuate said second valve to its closed position thereby to isolate said capacitor from said pneumatic means.

8. Apparatus in accordance with claim 6 including means operated by said bellows upon expansion thereof to actuate said second valve to its closed position thereby to isolate said capacitor from said pneumatic means, said pneumatic means including a valve member responsive to isolation of said capacitor for effecting actuation of said first valve to connect it to vacuum thereby connecting said bellows to vacuum to cause collapse thereof.

9. Apparatus in accordance with claim 6 including means operated by said bellows upon expansion thereof to actuate said second valve to its closed position thereby to isolate said capacitor from said pneumatic means, said pneumatic means including a valve member responsive to isolation of said capacitor for effecting actuation of said first valve to connect it to vacuum thereby connecting said bellows to vacuum to cause collapse thereof, and means actuated by said bellows upon collapse thereof to actuate said second valve to its open position thereby to connect said capacitor to said valve member.

References Cited in the file of this patent

UNITED STATES PATENTS

| | | |
|---|---|---|
| 1,920,003 | Chenault | July 25, 1933 |
| 2,071,215 | Petersen | Feb. 16, 1937 |
| 2,803,110 | Chittenden | Aug. 20, 1957 |
| 2,894,614 | Lambert et al. | July 14, 1959 |
| 2,932,375 | Lambert et al. | Apr. 12, 1960 |